(12) United States Patent
Han et al.

(10) Patent No.: US 10,372,286 B2
(45) Date of Patent: Aug. 6, 2019

(54) METHOD FOR CONTROLLING NOTIFICATION AND ELECTRONIC DEVICE THEREOF

(71) Applicant: Samsung Electronics Co., Ltd., Suwon-si, Gyeonggi-do (KR)

(72) Inventors: Jonghyun Han, Seoul (KR); Bo-Keun Kim, Suwon-si (KR); Kyuok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 221 days.

(21) Appl. No.: 15/179,300

(22) Filed: Jun. 10, 2016

(65) Prior Publication Data

US 2016/0370950 A1 Dec. 22, 2016

(30) Foreign Application Priority Data

Jun. 16, 2015 (KR) .......................... 10-2015-0085251

(51) Int. Cl.
| | |
|---|---|
| *G06F 9/48* | (2006.01) |
| *G06F 3/0481* | (2013.01) |
| *G06F 3/0486* | (2013.01) |
| *H04M 1/725* | (2006.01) |
| *G06F 3/0488* | (2013.01) |

(52) U.S. Cl.
CPC .......... *G06F 3/0481* (2013.01); *G06F 3/0486* (2013.01); *G06F 3/04883* (2013.01); *H04M 1/72522* (2013.01); *H04M 1/72583* (2013.01); *H04M 2250/22* (2013.01); *H04M 2250/60* (2013.01)

(58) Field of Classification Search
CPC ... H04L 51/38; G06Q 30/0267; G06F 3/0481; G06F 3/0486; G06F 3/04883; H04M 1/72522; H04M 1/72583; H04M 2250/22; H04M 2250/60
See application file for complete search history.

(56) References Cited

U.S. PATENT DOCUMENTS

| | | | |
|---|---|---|---|
| 2012/0102400 A1* | 4/2012 | Worley | ................ G06F 3/0488 715/702 |
| 2012/0117507 A1 | 5/2012 | Tseng et al. | |
| 2013/0007665 A1* | 1/2013 | Chaudhri | ................ H04L 51/24 715/830 |
| 2013/0069969 A1 | 3/2013 | Chang et al. | |
| 2013/0144674 A1* | 6/2013 | Kim | .................... G06Q 30/0267 705/7.19 |
| 2013/0227705 A1* | 8/2013 | Yoon | ....................... G06F 21/60 726/27 |
| 2014/0136993 A1 | 5/2014 | Luu et al. | |

(Continued)

OTHER PUBLICATIONS

EP Office Action dated Nov. 28, 2018 issued in EP Application No. 16811877.6.

*Primary Examiner* — Jennifer N To
*Assistant Examiner* — K C Chen
(74) *Attorney, Agent, or Firm* — Jefferson IP Law, LLP

(57) ABSTRACT

An electronic device and operation method of the electronic device are provided. The electronic device includes a display unit configured to display a notification, and a processing unit configured to sense a set input and store the displayed notification corresponding to the sensed set input. The storing of the notification is displayed in the display unit.

18 Claims, 16 Drawing Sheets

(56) References Cited

U.S. PATENT DOCUMENTS

| | | |
|---|---|---|
| 2014/0143683 A1* | 5/2014 | Underwood, IV ...... H04L 51/38 |
| | | 715/752 |
| 2014/0334271 A1 | 11/2014 | Park et al. |
| 2014/0364103 A1 | 12/2014 | Marti et al. |
| 2014/0364148 A1 | 12/2014 | Block et al. |
| 2015/0007049 A1 | 1/2015 | Langlois |
| 2015/0026647 A1 | 1/2015 | Park et al. |
| 2015/0149954 A1 | 5/2015 | Lin |
| 2015/0177970 A1* | 6/2015 | Choi .................. H04L 12/1895 |
| | | 715/752 |

\* cited by examiner

METHOD FOR CONTROLLING NOTIFICATION AND ELECTRONIC DEVICE THEREOF

CROSS-REFERENCE TO RELATED APPLICATION(S)

This application claims the benefit under 35 U.S.C. § 119(a) of a Korean patent application filed on Jun. 16, 2015 in the Korean Intellectual Property Office and assigned Serial number 10-2015-0085251, the entire disclosure of which is hereby incorporated by reference.

TECHNICAL FIELD

The present disclosure relates to an electronic device for controlling a notification and an operation method thereof.

BACKGROUND

Recently, with the growth of digital technologies, various types of electronic devices are being widely used such as mobile communication terminals, smart phones, tablet personal computers (PCs), personal digital assistants (PDAs), electronic organizers, notebook computers or wearable devices, etc. The electronic devices are coming to a mobile convergence level encompassing even functions of other devices. The electronic devices can, for example, provide a calling function such as a voice call and a video call, a message transceiving function such as a short message service (SMS)/multimedia message service (MMS), electronic mail (e-mail), an electronic organizer function, a camera function, a broadcast play function, a video play function, a music play function, an internet function, a messenger function, a game function, or a social networking service (SNS) function, etc.

The electronic devices can display, to users, notifications corresponding to the various functions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for controlling a notification and an operation method thereof.

An electronic device can control a notification that is generated within the electronic device. In more detail, the electronic device can display the notifications that indicate various events occurring within the electronic device, and can store the notifications.

In accordance with an aspect of the present disclosure, an electronic device is provided. The electronic device includes a display unit configured to display a notification, and a processing unit configured to sense a set input and store the displayed notification corresponding to the sensed set input. The storing of the notification is displayed in the display unit.

In accordance with another aspect of the present disclosure, an operation method of an electronic device is provided. The method includes displaying a notification, sensing a set input, storing the displayed notification corresponding to the sensed set input, and displaying the storing of the notification.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
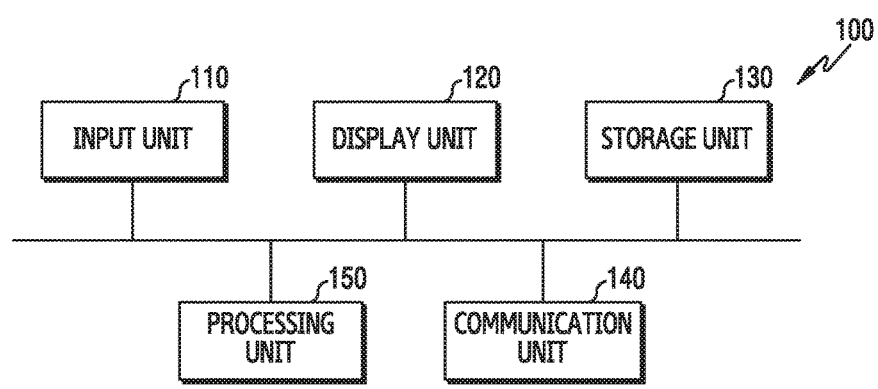
FIG. 1 illustrates an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein including the technological or scientific terms have the same meaning as those commonly understood by a person having ordinary knowledge in the art mentioned in the present document. Among the terms used in the present document, the terms defined in a general dictionary can be interpreted as the same or similar meanings as the contextual meanings of a related technology, and are not interpreted as ideal or excessively formal meanings unless defined clearly in the present document. According to cases, even the terms defined in the present document cannot be interpreted to exclude embodiments of the present document.

An electronic device according to various embodiments of the present document can, for example, include at least one of a smart phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer III (MP3) player, a mobile medical instrument, a camera, or a wearable device. According to various embodiments of the present disclosure, the wearable device can include at least one of an accessory type (e.g., a watch, a ring, a wristlet, an anklet, a necklace, glasses, a contact lens, or a head-mounted-device (HMD), etc.), a fabric or clothing integrated type (e.g., electronic clothes), a body mount type (e.g., a skin pad or tattoo), or a bio-physical implantation type (e.g., an implantable circuit).

Various embodiments of the present disclosure described below exemplify and describe a hardware access method. However, because various embodiments of the present disclosure include a technology using all hardware and software, the various embodiments of the present disclosure do not intend to exclude a software-based access method.

FIG. 1 illustrates an electronic device according to various embodiments of the present disclosure.

Referring to FIG. 1, the electronic device 100 can include an input unit 110, a display unit 120, a storage unit 130, a communication unit 140, and a processing unit 150.

The input unit 10 can receive an instruction or data from a user. Also, the input unit 110 can be a touch panel. The input unit 110 can sense a touch or hovering input of the finger and a pen. The input unit 110 can include a sensor. The sensor can be attached to the touch panel of the input unit 110 independently. The sensor can include a sensor (for example, an acceleration sensor, a geomagnetic sensor, a gyro sensor, etc.) for sensing a location of the electronic device 100, a motion of the electronic device 100, etc. The electronic device 100 can sense its own state through the sensor.

A method of performing an input can be a touch and release, a drag and drop, etc. The input unit 110 can provide the processing unit 150 with an input received through a touch, etc. and data associated with the input. According to various embodiments of the present disclosure, the input unit 110 can generate an input (hereinafter, referred to as a set input) that is set to store a notification generated in the electronic device 100. Here, the set input can be a touch and release, a drag and drop or a gesture, and may be an output of the sensor. For example, the set input can be a behavior in which a user directly touches a notification displayed in the display unit 120, a behavior in which the user inputs a motion to the electronic device 100 (for example, leans the electronic device 100 to the right) corresponding to the notification displayed in the display unit 120.

The display unit 120 can be a liquid crystal display (LCD) or light emitting diode (LED) display. The display unit 120 can display various types of information (for example, multimedia, text data, etc.) to a user. For example, the display unit 120 can display a graphical user interface (GUI) so that a user can interact with the electronic device 100. According to various embodiments of the present disclosure, the display unit 120 can display a notification according to an event that takes place in the electronic device 100. Also, the display unit 120 can display a storage position of a notification that is stored through a set input. Also, the display unit 120 can display notification information and a panel.

The input unit 110 and the display unit 120 can be comprised of an integral-type touch screen.

The storage unit 130 can mean one or more memory assemblies. The storage unit 130 can store data and/or instructions that are received from or generated by other constituent elements (for example, the input unit 110, the display unit 120, the communication unit 140, the processing unit 150, etc.). According to various embodiments of the present disclosure, the storage unit 130 can include a common region storing a non-designated notification or a designated region (may be plural) distinguishing and storing a designated notification.

The communication unit 140 can have a diversity of communication functions (for example, long-term evolution (LTE), Bluetooth, near field communication (NFC), etc) for communication between the electronic device 100 and an external system. The communication unit 140 can establish a communication between the electronic device 100 and the external system. For example, the communication unit 140 can be connected to a network through wireless communication or wired communication, and communicate with the external device.

The processing unit 150 can be implemented as a system on chip (SoC). Also, if necessary, the processing unit 150 may be each separated and implemented to combine with the internal constituent element (for example, the input unit, the display unit, etc.) of the electronic device 100.

The processing unit 150 can receive instructions of other constituent elements (for example, the input unit 110, the display unit 120, the storage unit 130, the communication unit 140, etc.), and can interpret the received instructions, and can perform determination or process data in accordance with the interpreted instructions. The processing unit 150 can sense inputs that are generated in the internal part or external part of the electronic device MO, and can analyze the sensed result. Also, the processing unit 150 can grasp the content of a notification that is stored through a set input, and can sort the stored notification based on the grasped content. Also, the processing unit 150 can control the display unit 120. Also, if a first set input is detected after a notification is generated, the processing unit 150 can store the notification in the storage unit 130 and display this in a common region. Also, if a second set input is detected after the notification is generated, the processing unit 150 can store the notification in the storage unit 130 and display this in a designated region.

Figure 2:
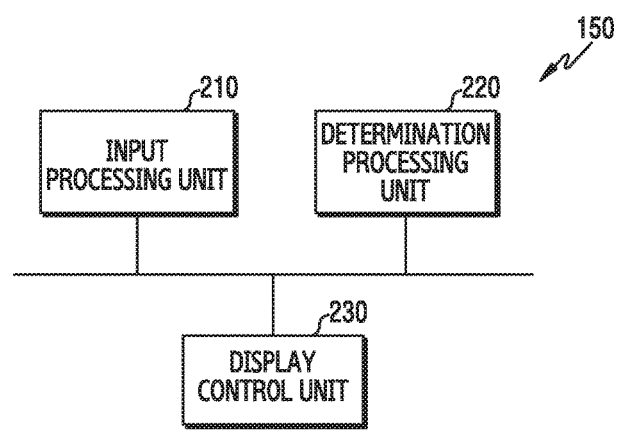
FIG. 2 illustrates a processing unit according to various embodiments of the present disclosure.

FIG. 2 illustrates the processing unit 150 according to various embodiments of the present disclosure.

Referring to FIG. 2, the processing unit 150 can include an input processing unit 210, a determination processing unit 220, and a display control unit 230.

The input processing unit 210 can detect a user's set input that is input through the input unit 110. The input processing unit 210 can forward data about the detected user's set input to the determination processing unit 220, the display control unit 230, etc.

The set input can be input in a form of touch or hovering. The set input can be generated in a form of a touch and release, a drag and drop, a gesture, etc. The set input can be comprised of a first set input for storing a notification in a common region and a second set input for storing the notification in a designated region. The second set input can be generated successive followed by the first set input. For example, the second set input can be input successively in a state in which the first set input is not released. For example, the first set input can be an input that moves in a first direction, and the second set input can be an input that moves in a second direction successively after moving in the first direction. Here, the first direction be a vertical direction and the second direction can be a horizontal direction.

Also, the set input can be signals that are sensed by sensors. For example, if a user tilts the electronic device 100 in a first direction, the input processing unit 210 can determine this as the first set input. If the user tilts the electronic device 100 in a second direction successively from a state of tilting the electronic device 100 in the first direction, the input processing unit 210 can determine this as the second set input. The first set input and the second set input may be set using both the outputs of the input unit 110 and the sensor.

The input processing unit 210 can process an input signal that is generated in the input unit 110 (or the sensor), and can detect and process a set input (for example, a first set input or a second set input) that is generated in a state in which a notification is displayed.

The determination processing unit 220 can perform a function of determining several states that are generated in association with a notification.

The determination processing unit 220 can process set input data about a user's notification received from the input processing unit 210. The determination processing unit 220 can receive the set input data about the user's notification from the input processing unit 210 and compare the received set input data with reference data. Thereafter, the determination processing unit 220 can determine if the received set input data and the reference data are consistent with each other. If the received set input data and the reference data are consistent, the determination processing unit 220 can control the electronic device 100 to store the notification in a storage region corresponding to a set input. For example, the determination processing unit 220 can determine that the set input is an operation of storing a notification whose sorting is unnecessary, and control the electronic device 100 to store the notification in a common region. Unlike this, the determination processing unit 220 can determine that the set input is an operation of storing a notification whose sorting is necessary, and control the electronic device 100 to store the notification in a designated region.

The determination processing unit 220 can control the electronic device 100 so that the stored notification interworks with other functions of the electronic device 100. For example, based on the type or content of the stored notification, the determination processing unit 220 can determine whether there is an application related to a notification, whether there is an application executable through the notification, whether there is a function of the electronic device 100 that will interwork with the notification, etc.

The determination processing unit 220 can determine if a notification display event takes place in the electronic device 100, and can process the notification display event. Here, the notification display event can be a meaning including all methods of calling the stored notification. For example, the notification display event can be a behavior in which a user directly inquires the stored notification. Also, the notification display event can even be a behavior in which the user executes an application related to the stored notification. In a case where it is determined that the notification display event takes place, the determination processing unit 220 can control the electronic device 100 to display a notification corresponding to the notification display event.

The determination processing unit 220 can sort (i.e., group) the stored notification. In a case where a notification stored in the electronic device 100 is plural, the determination processing unit 220 can sort the stored notification by a specific reference so that a user can easily process the stored notification. For example, the determination processing unit 220 can sort the stored notification into a schedule notification (for example, a notification associated with a phone, an alarm, a timer, etc., a notification of communication between people (for example, a notification associated with a text message, asocial networking service (SNS), etc.), an electronic device state notification (for example, a notification associated with Wi-Fi activation, data use restriction, etc., etc., in accordance with a use. Also, the determination processing unit 220 may sort the stored notification based on people reference or temporal order.

The determination processing unit 220 can sense a set input that is detected in the input processing unit 210 in a state in which a notification is displayed. If the set input is sensed, the determination processing unit 220 can store the displayed notification in the storage unit 130 corresponding to the sensed set input. The storage unit 130 can distinguish and store notifications in a common region and at least one or more designated regions. The input processing unit 210 can detect a first set input or a second set input. If the input processing unit 210 detects the first set input, the determination processing unit 220 can process to store the notification in the common region corresponding to the detected first set input. If the input processing unit 210 detects the second set input, the determination processing unit 220 can process to store the notification in the designated region corresponding to the detected second set input.

The display control unit 230 can control displaying of the stored notification.

In a case where a notification is stored through a set input, the display control unit 230 can control the electronic device 100 to display a storage position of the notification. For example, in a case where the operation of storing the notification is ended, the display control unit 230 can control the electronic device 100 so that the storage position (for example, a common region or a designated region) of the notification is displayed for a certain time after a storage operation ending time point.

The display control unit 230 can control the electronic device 100 so that a notification panel is activated (displayed), a user touches a specific region (for example, an application icon executing a notification inquiry, a button of a quick panel of the electronic device, an unidentified notification indicator, etc.) within the electronic device 100 to inquire a notification, the display control unit 230 can display the notification panel in a defined region of the electronic device 100. The user can distinguish and inquire a stored notification through the notification panel on a per-storage-region basis.

The display control unit 230 can control the electronic device 100 to distinguish a notification stored in a common region and a notification stored in a designated region. For example, the display control unit 230 can control the electronic device 100 such that the notification stored in the common region is displayed in a window of a red background, and the notification stored in the designated region is displayed in a window of a blue background. Here, the distinguishing through the color (red or blue in the above example) is merely exemplary. Various methods of distinguishing a notification in accordance with a storage region (for example, a method of varying a color of a notification, or varying a font of a text of a notification, or varying a notification display position, etc.) can be applied to the electronic device 100.

The display control unit 230 can control the electronic device 100 such that an application and a notification are overlapped and displayed. For example, in a case where a notification corresponding to an application has been stored in a storage region, the display control unit 230 can control the electronic device 100 such that the corresponding notification is displayed on an execution screen of the application. At this time, a method of displaying the notification on the execution screen of the application can include various methods capable of having the user recognize the notification. For example, this can be a method of displaying a notification at an upper end or downward of the execution screen of the application, a method of displaying a notification to overlap with the execution screen of the application, etc.

The determination processing unit 220 can display a notification stored in the storage unit 130.

When the electronic device 100 executes an application, the determination processing unit 220 can determine if a notification related to the corresponding application has been stored. At this time, if the notification related to the executed application has been stored, the determination processing unit 220 can access the corresponding notification in the storage unit 130. The determination processing unit 220 can process such that the accessed notification is displayed in the display unit 120 by means of the display control unit 230.

The determination processing unit 220 can then analyze an output of the input processing unit 210 and display a stored notification. If the input processing unit 210 detects a notification inquiry demand input, the determination processing unit 220 can display a notification panel corresponding to the sensed notification inquiry demand input through the display control unit 230. If the input processing unit 210 detects a notification selection in the notification panel, the determination processing unit 220 can select a corresponding notification in the storage unit 130. The determination processing unit 220 can process such that the display control unit 230 controls to display the selected notification in the display unit 120. At this time, the notification panel displayed in the display unit 120 through the control of the display control unit 230 can include information selecting a common region or designated regions, and can display in the display unit 120 a notification stored in a region selected in the notification panel.

Thirdly, if there is an unidentified notification, the determination processing unit 220 can display an unidentified notification indicator in the display unit 120 through the display control unit 230. If there is an unidentified notification among notifications stored in the storage unit 130, the determination processing unit 220 can process to display an unidentified notification indicator through the display control unit 230. The unidentified notification indicator can be displayed through an icon image that is created by the user's setting. The unidentified notification indicator may be displayed through an icon image displayed in a default position. If the unidentified notification indicator is selected in a state in which the unidentified notification indicator is displayed, the determination processing unit 220 can process to display a notification panel in the display unit 120 through the display control unit 230. The determination processing unit 220 can process to select a notification stored in a region selected in the displayed notification panel and display the selected notification in the display unit 120.

An electronic device according to various embodiments of the present disclosure can include a display unit for displaying a notification, and a processing unit for storing the displayed notification corresponding to the sensed set input, and the storing of the notification can be displayed in the display unit.

A region displaying an object indicating the storing of the notification includes one or more of a common region and a designated region. If the set input is a first set input, the processing unit can store the notification and display the stored notification in the common region, and if the set input is a second set input, the processing unit can store the notification and display the stored notification in the designated region corresponding to the notification. The first set input can be an input that moves in a first direction, and the second set input can be an input that moves in a second direction successively after the first set input moving in the first direction. The processing unit can store the displayed notification in a common region corresponding to the release of the first set input, and can store the displayed notification in a designated region corresponding to a position in which the second set input is released, corresponding to the release of the second set input.

Also, the designated region can be plural, and the processing unit can distinguish and store notifications corresponding to the designated regions in accordance with type.

The processing unit can check if a notification related to an application has been stored corresponding to the execution of the application and, if there is the stored notification, the processing unit can access the corresponding notification. The display unit can display the accessed notification. The processing unit can sense a notification inquiry demand input, and the display unit can display a notification panel corresponding to the sensed notification inquiry demand input, and can display a notification included in a region selected in the notification panel. The display unit can display the notification panel including a common region or designated regions, and the processing unit can display in the display unit a notification stored in a region selected in the displayed notification panel.

If there is an unidentified notification, the processing unit can display an unidentified notification indicator in the display unit, and if the indicator is selected, the processing unit can display a notification panel in the display unit, select a notification stored in a region selected in the displayed notification panel, and display the selected notification in the display unit.

The processing unit can analyze the stored notification, and can vary one or more of a size, color, and display position corresponding to the analysis result of the stored notification to display the notification.

Figure 3:
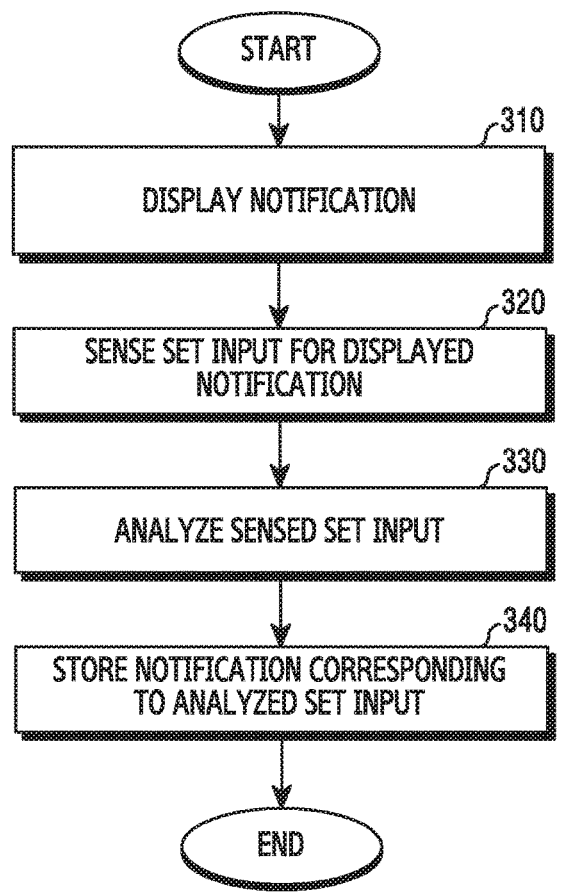
FIG. 3 is a flowchart illustrating an operation of an electronic device according to various embodiments of the present disclosure.

FIG. 3 is a flowchart illustrating an operation of an electronic device according to various embodiments of the present disclosure.

Referring to FIG. 3, if an event occurs, in operation 310, the electronic device 100 can display a notification corresponding to the event. Here, the event can be a notification (for example, an incoming call, an incoming message, etc.) received from external through the communication unit 140 or a notification (for example, an alarm, schedule information, device state information, etc.) generated in the electronic device 100. The displaying of the notification can be achieved on a home screen of the electronic device 100, a lock screen, a quick panel, an application execution screen, etc.

In a state in which the notification is displayed in the electronic device 100, a user can generate an input (i.e., a set input) for processing the displayed notification in the input unit 110. If the input is generated in the input unit 110 in a state in which the notification is displayed, in operation 320, the electronic device 100 can sense the set input for the displayed notification. For example, the electronic device 100 can sense a set input of a user who touches or drags and drops the displayed notification.

If the user's set input is sensed, in operation 330, the electronic device 100 can analyze the sensed set input. In more detail, the electronic device 100 can check if the set input that the user performs is consistent with a defined input. If the set input that the user performs corresponds to the defined input, the electronic device 100 can determine whether the set input that the user performs is an instruction of instructing to process the notification in some way. That is, in operation 330, the electronic device 100 can determine whether to store the displayed notification and/or, if so, whether to store the notification in a folder corresponding to the analyzed set input.

Thereafter, in operation 340, the electronic device 100 can store the notification in accordance with the determination result.

Here, the operation procedure of FIG. 3 is possible to be abbreviated to include a process of storing a displayed notification if a user input (for example, a gesture) corresponding to a preset input is sensed in a state in which the notification is displayed. The storing of the notification can be shown in the display unit. The storing of the notification can include displaying a certain object. The object can be a thin line, and may be expressed in other ways. A region displaying the object indicating the storing of the notification can include one or more of a common region of the display unit and a designated region thereof.

Figure 4:
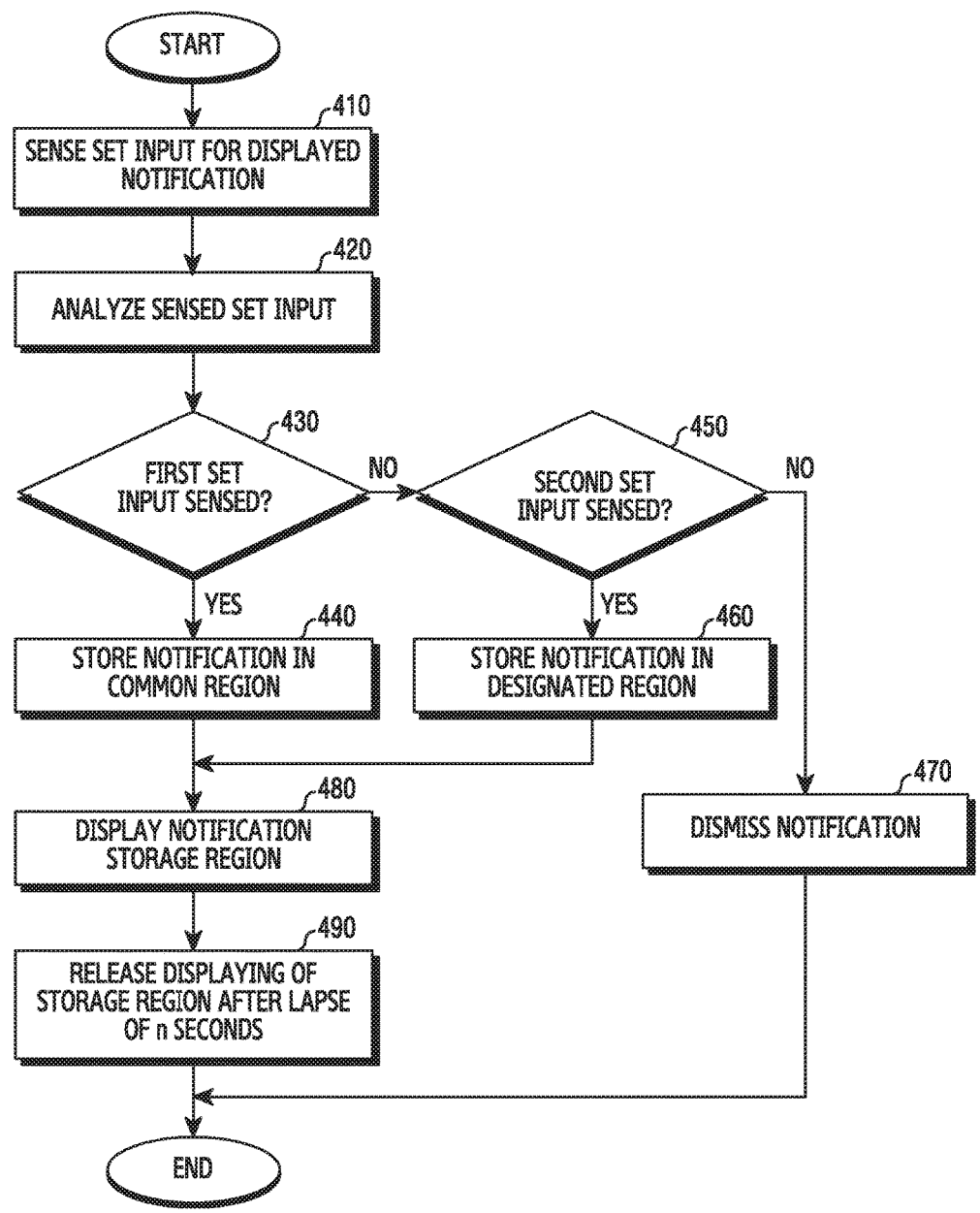
FIG. 4 is a flowchart illustrating an operation of an electronic device storing a notification according to various embodiments of the present disclosure.

FIG. 4 is a flowchart illustrating an operation of an electronic device storing a notification according to various embodiments of the present disclosure.

Referring to FIG. 4, in operation 410, the electronic device 100 can sense a set input for a notification displayed in the electronic device 100.

Thereafter, in operation 420, the electronic device 100 can analyze the sensed set input.

Thereafter, in operation 430, the electronic device 100 can determine if a first set input has been sensed. Here, the first set input can be an operation previously defined within the electronic device 100. The first set input can include several operations for storing the displayed notification in a common region. For example, the first set input can be an operation of touching and dragging and dropping the displayed notification in a specific direction (referred below to as a first direction), an operation of inputting a motion to the electronic device 100 to move the displayed notification, etc.

In a case where the first set input is sensed, in operation 440, the electronic device 100 can store the displayed notification in the common region. Here, the common region can be a space storing a notification when a user determines that special sorting is unnecessary but storage is demanded.

Otherwise, in operation 450, the electronic device 100 can determine if a second set input has been sensed. Here, the second set input can be an operation previously defined within the electronic device 100. The second set input can include several operations for storing the displayed notification in a designated region. The second set input can be achieved through a combination of several set inputs including the first set input. For example, the second set input can be an operation of touching, dragging, and dropping the displayed notification in a direction different from the first direction, etc. For example, if a user touches, drags, and drops the displayed notification in a downward direction (for example, a second direction) and then drags and drops in a left direction (for example, the first direction), in operation 450, the electronic device 100 can determine that this is an operation for storing the notification in the designated region.

In a case where it is determined to be the second set input, in operation 460, the electronic device 100 can store the displayed notification in the designated region. Here, the designated region can be a space storing a notification as to which the user determines that sorting is necessary and storage is demanded for the sake of convenience of future processing. The designated region may be set in plural in accordance with user's setting.

In a case where the first set input and the second set input are not sensed, in operation 470, the electronic device 100 can dismiss the displayed notification. Here, the dismissing can be a meaning of not storing the displayed notification. That is, the dismissing can include a meaning of deleting, hiding, etc.

In a case where the displayed notification is stored in a storage region (i.e., the common region or the designated region), in operation 480, the electronic device 100 can display in the display unit 120 the region where the displayed notification is stored. In operation 490, the electronic device 100 can release the displaying of the storage region after a certain time elapses, for example n seconds. That is, the electronic device 100 can remind the user of the notification storage region through operations 480 and 490.

Figure 5A:
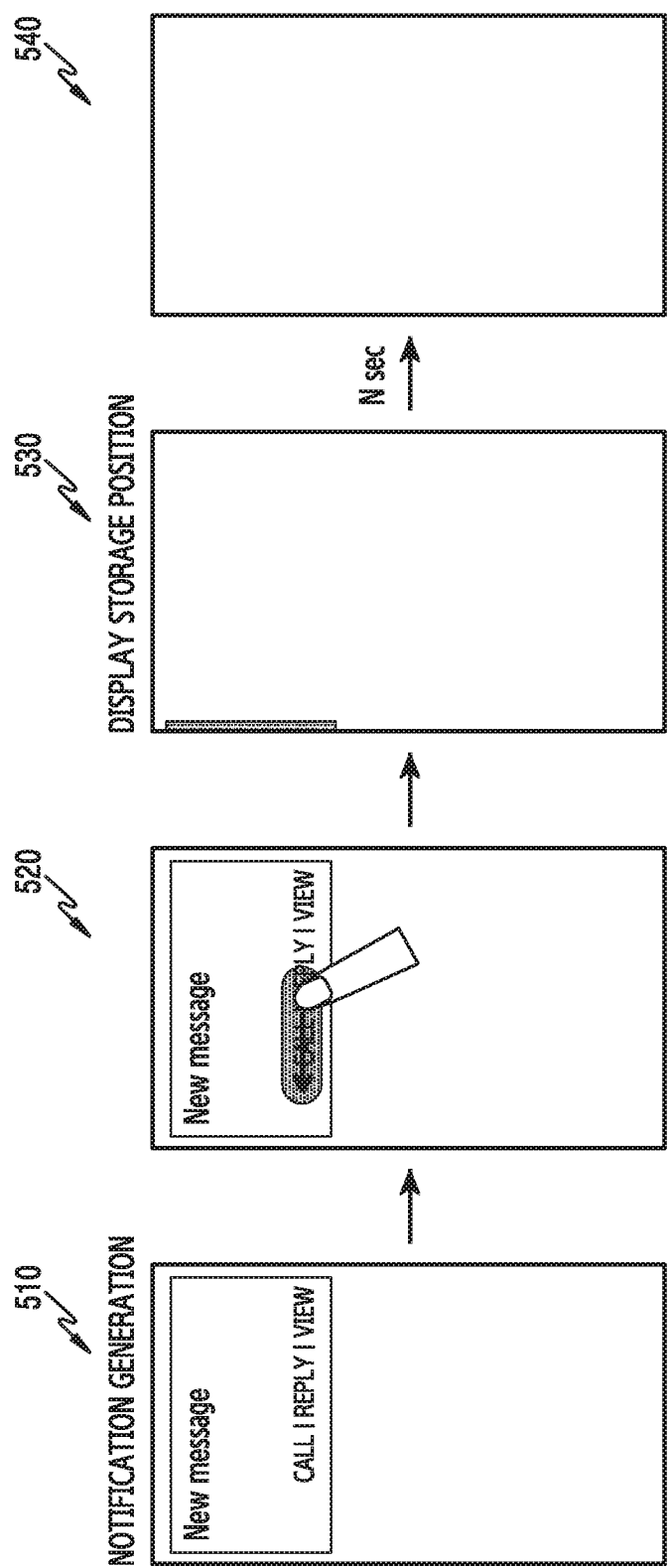
FIG. 5A illustrates a user interface (UI) storing a notification in a common region, through a set input according to various embodiments of the present disclosure.

FIG. 5A illustrates a user interface (UI) storing a notification in a common region, through a set input according to various embodiments of the present disclosure.

Referring to FIG. 5A, a UI 510 can be a screen on which a notification is generated. Here, the UI 510 in which the notification is displayed can be a home screen, a lock screen, a quick panel, etc.

A UI 520 can be a screen storing the displayed notification through a set input. Here, an operation of touching and dragging and dropping the displayed notification in a left direction can represent a first set input. If a user inputs the first set input for the notification as in the UI 520, the displayed notification can be stored in a common region.

A UI 530 can be a screen displaying the storage region after the displayed notification is stored in the common region through the set input. A UI 540 can be a screen releasing the displaying of the storage region after the lapse of a certain time (for example, the lapse of n seconds).

Figure 5B:
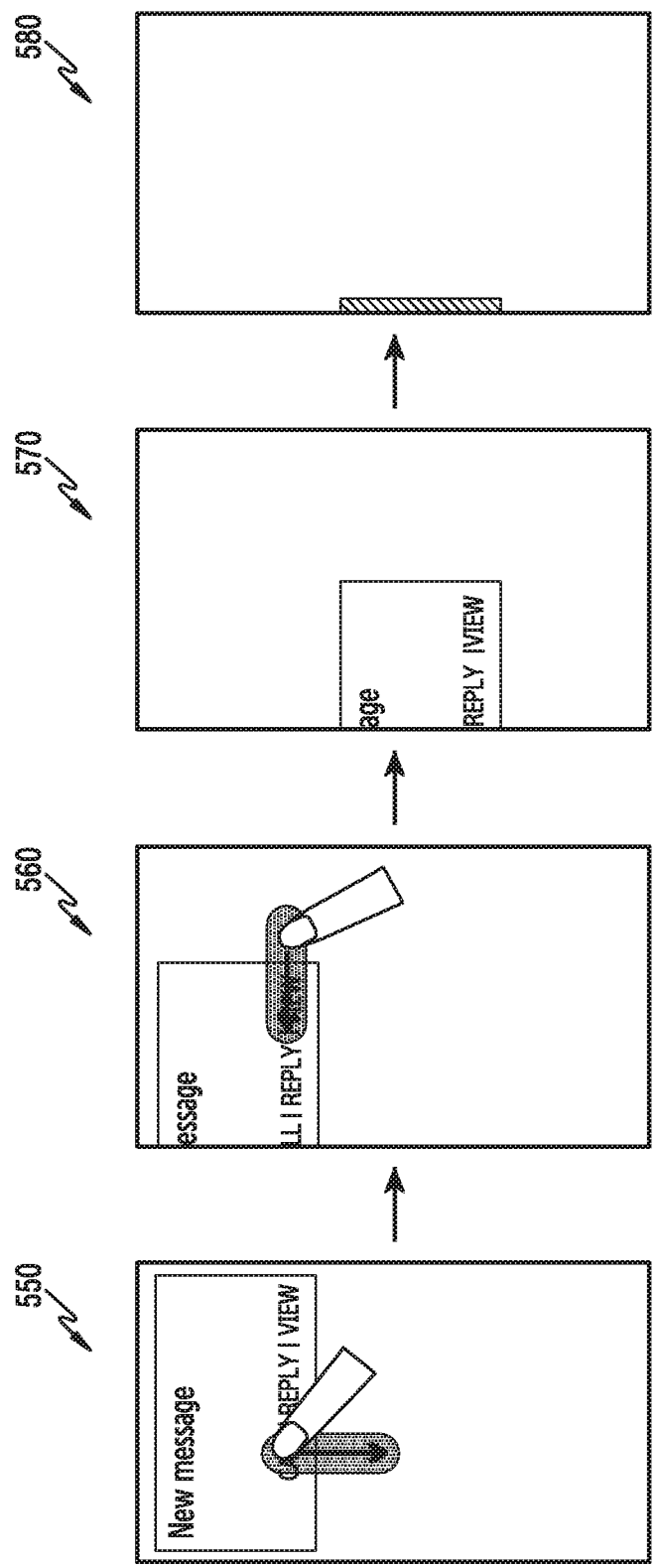
FIG. 5B illustrates a UI storing a notification in a designated region, through a set input according to various embodiments of the present disclosure.

FIG. 5B illustrates a user interface storing a notification in a designated region, through a set input according to various embodiments of the present disclosure.

Referring to FIG. 5B, a UI 550 can be a screen touching, dragging, and dropping a displayed notification in a downward direction of the electronic device 100, A UI 560 can be a screen dragging and dropping in a left direction the notification that is dragged and dropped in the downward direction. Here, an operation of, after touching, dragging and dropping in the downward direction and the left direction can be a second set input. The second set input can include the first set input dragging and dropping in the left direction. Also, the order of dragging and dropping in the left direction and the downward direction may be varied. That is, a user may store the displayed notification in the designated region by dragging and dropping the displayed notification in the downward direction and then dragging and dropping in the left direction.

A UI 570 can be a screen in which the notification is inserted to the designated region through the second set input. A UI 580 can be a screen displaying a storage position after the notification is stored in the designated region through the set input. Unlike the UI 530, in the UI 580, it can be appreciated that the storage region is displayed differently. Through the UI 530 and UI 580, the user can be reminded of the storage region. Though not illustrated in FIG. 5B, the electronic device 100 can release the displaying of the storage region after the UI 580 is performed, as in the UI 540 of FIG. 5A.

Figure 6:
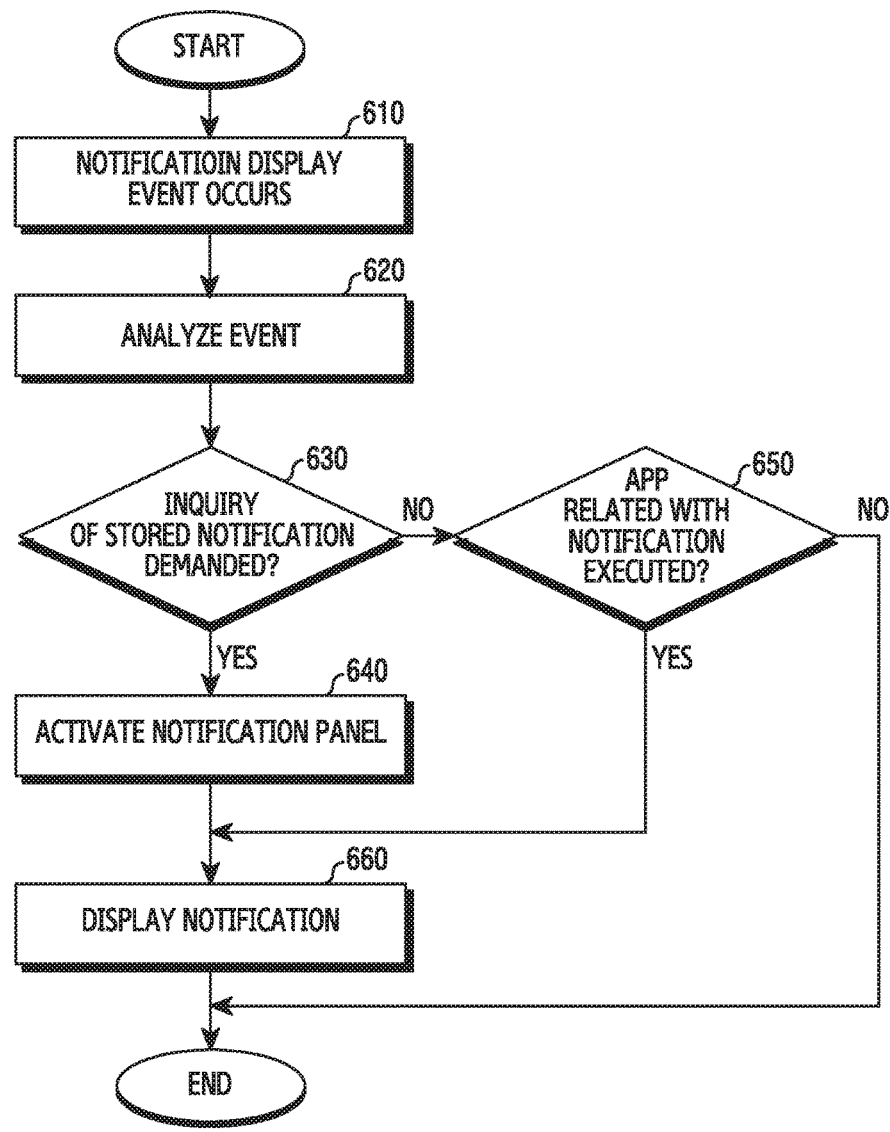
FIG. 6 is a flowchart illustrating an operation of an electronic device displaying a stored notification according to various embodiments of the present disclosure.

FIG. 6 is a flowchart illustrating an operation of an electronic device displaying a stored notification according to various embodiments of the present disclosure.

Referring to FIG. 6, in operation 610, the electronic device 100 can generate a notification display event. Here, the notification display event can mean a situation in which the displaying of a stored notification is demanded in accordance with various embodiments of the present disclosure. If the notification display event takes place, in operation 620, the electronic device 100 can analyze the notification display event. That is, in operation 620, the electronic device 100 can determine if it is a situation having to display the stored notification.

Thereafter, in operation 630, the electronic device 100 can determine if the inquiry of the stored notification has been demanded. Here, the demand for the inquiry of the stored notification is an operation in which a user directly calls the stored notification, and can be exemplary of the notification display event. The notification inquiry demand can be made through a predefined behavior such as a behavior in which the user touches an icon within a quick panel, a behavior in which the user executes a notification inquiry application, a behavior in which the user touches an unidentified notification indicator displayed in the electronic device, etc. If it is determined that the demand for the inquiry of the stored notification has been made, in operation 640, the electronic device 100 can activate a notification panel (that is, display the notification panel in the display unit 120). The notification panel can perform a function in which the user directly inquires the stored notification through various inputs such as a touch input, a motion input, etc.

If it is determined that there is not the demand for the inquiry of the stored notification in operation 630, in operation 650, the electronic device 100 can determine if an application associated with the stored notification has been executed. Here, operations 630 and 650 are merely exemplary, and various determination operations representing the notification display event can be added.

If it is determined in operations 630 and 650 that the notification has been inquired or the notification related application has been executed, in operation 660, the electronic device 100 can display the notification. Here, the displaying of the notification can be performed in various schemes. For example, in a case where the inquiry of the stored notification is demanded, the electronic device 100 can display the stored notification on a screen of the electronic device 100 of a current state. At this time, the notification displayed through the inquiry can be displayed differently according to a position in which the notification is stored, content included in the notification, the type of the notification, an application interworking with the notification, etc. Unlike this, in a case where the application related to the notification is executed, the electronic device 100 can display the notification related to the application along with an execution screen of the application. In this case, the notification panel may not be activated as illustrated in FIG. 6. The notification displayed through the execution of the application can be displayed differently according to its importance, content, etc.

Figure 7:
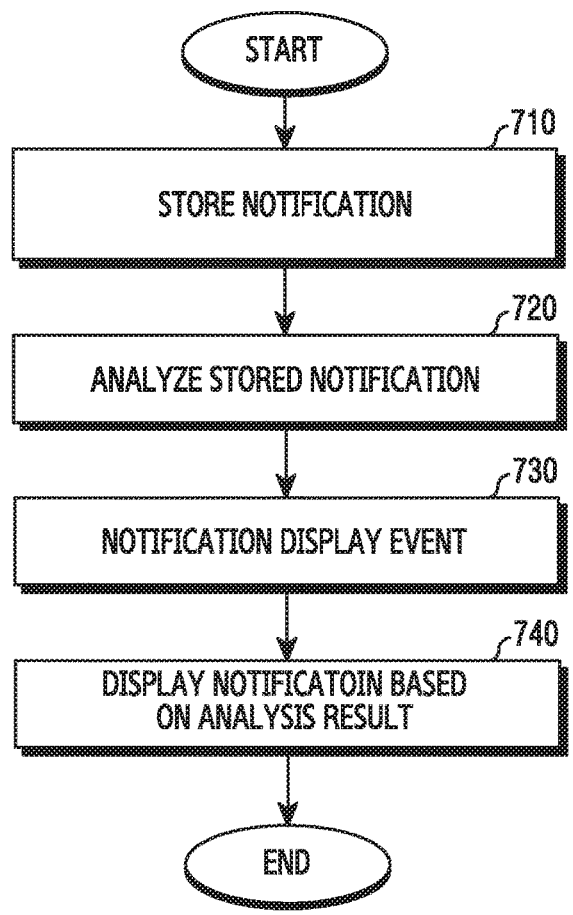
FIG. 7 is a flowchart illustrating an operation of an electronic device processing a stored notification according to various embodiments of the present disclosure.

FIG. 7 is a flowchart illustrating an operation of an electronic device processing a stored notification according to various embodiments of the present disclosure.

Referring to FIG. 7, in operation 710, the electronic device 100 can store a notification. The storing of the notification can be the storing of the notification through a set input. Thereafter, in operation 720, the electronic device 100 can analyze the stored notification. In more detail, in operation 720, the electronic device 100 can sort the stored notification in various schemes based on the type of the notification, the content of the notification, an application associated with the notification, an importance of the notification, etc. For example, the electronic device 100 can classify the stored notification into a schedule notification (for example, a notification related to a phone, an alarm, a timer, etc.), a notification of communication between people (for example, a notification related to a text message, an SNS, etc.), an electronic device status notification (for example, a notification related to Wi-Fi activation, data use restriction, etc.), etc. The notification of communication between people can be again grouped through name sorting, time order sorting, etc. Thereafter, if a notification display event occurs as in operation 730, in operation 740, the electronic device 100 can display the notification in various modes based on the analysis result.

For example, in a case of displaying the schedule notification, the schedule notification can be displayed including a menu of an alarm function, a snooze function, a timer function, etc. Also, the schedule notification can include a menu interworking with an application such as a watch application, a calendar application, a memo application, etc.

In a case of displaying the notification of communication between people, the notification of communication between people can include a menu of sorting by name, a menu of sorting by transmission/reception time, a menu of sorting by corresponding application type, etc.

In a case of displaying the electronic device status notification, the electronic device status notification can include status information, installation time information, etc., which are installed or updated, etc., within the electronic device 100.

Figure 8A:
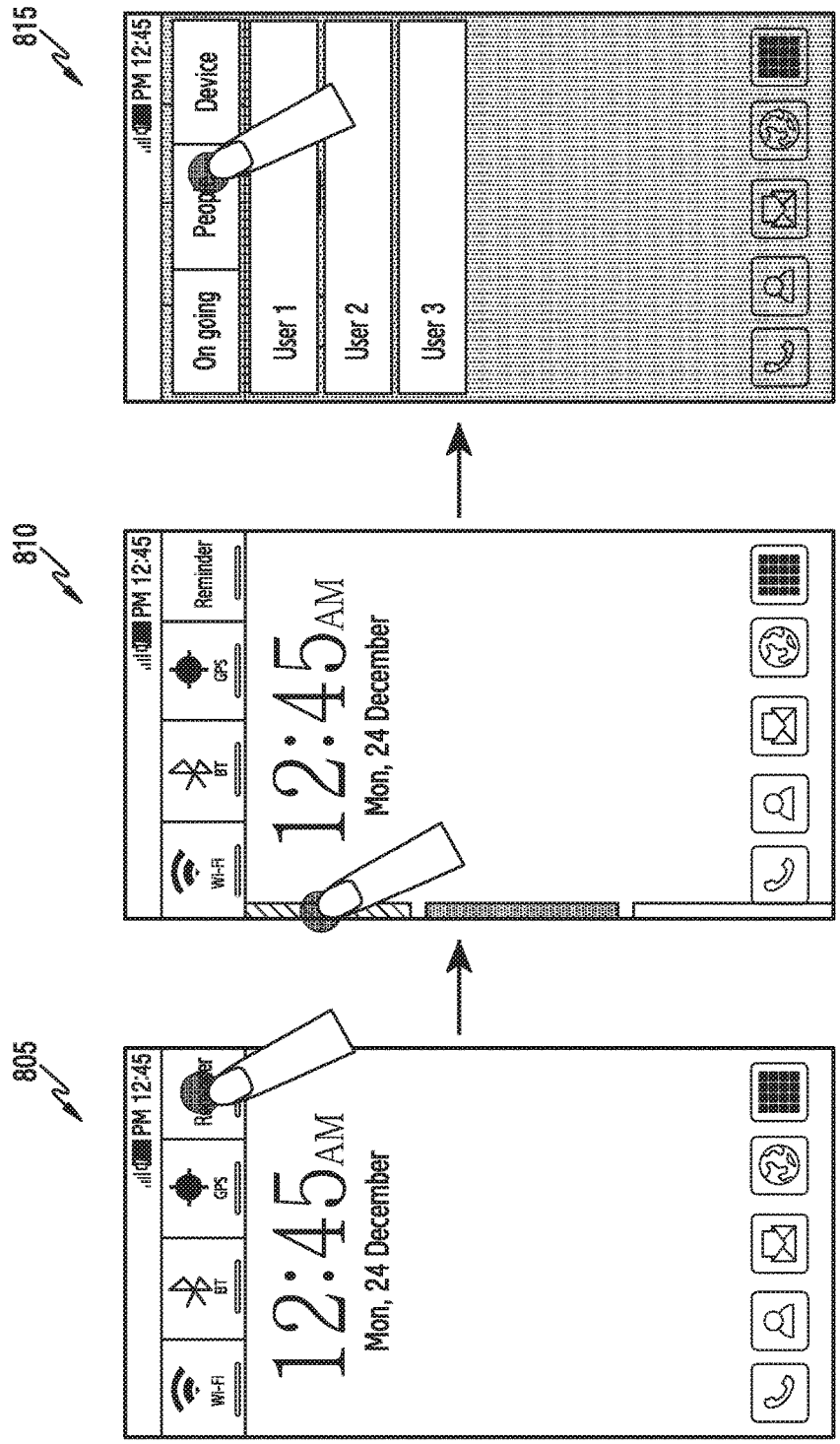
FIGS. 8A, 8B, and 8C, illustrate UIs inquiring a stored notification in accordance with various embodiments of the present disclosure.
Figure 8B:
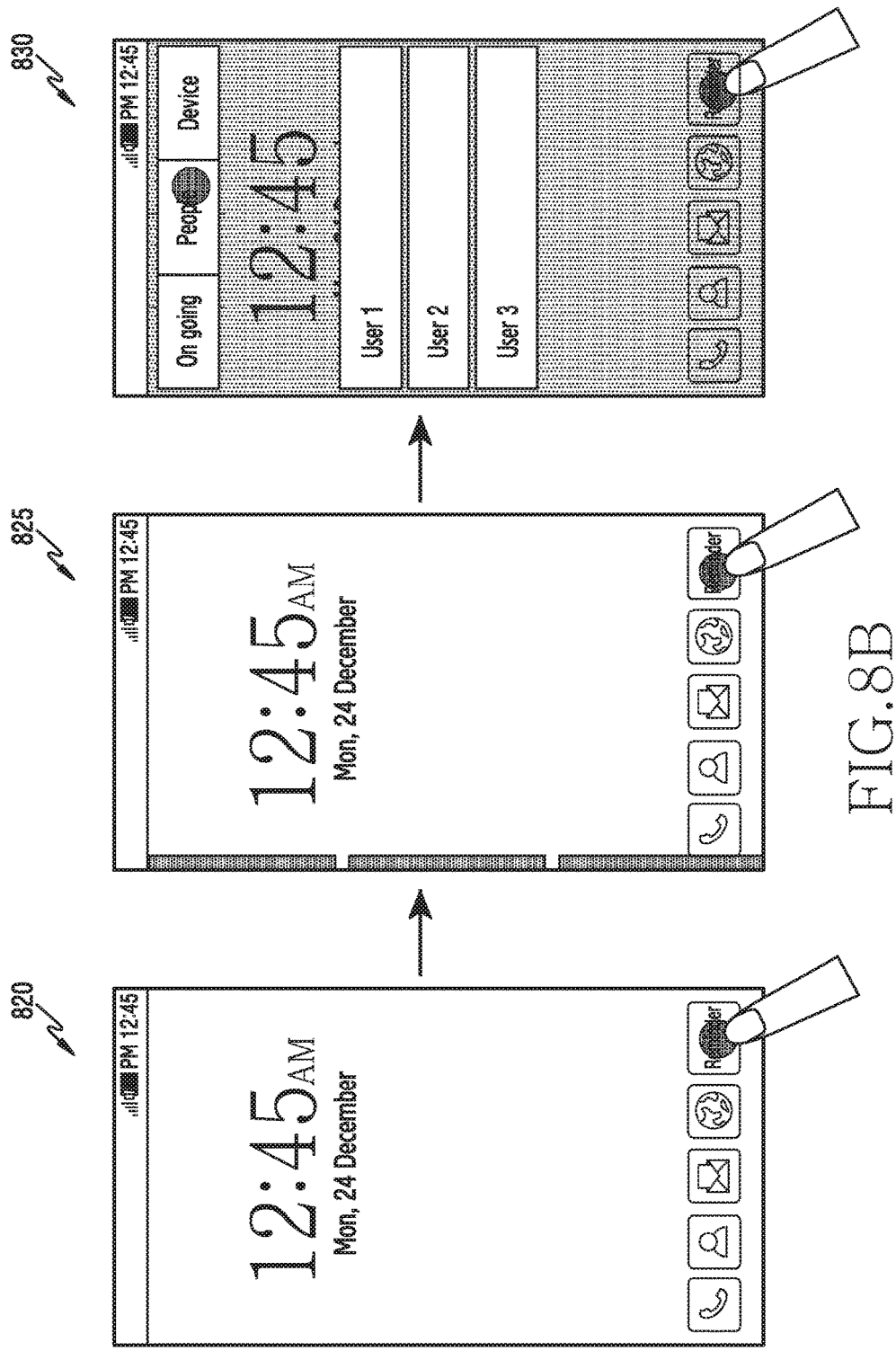
Figure 8C:
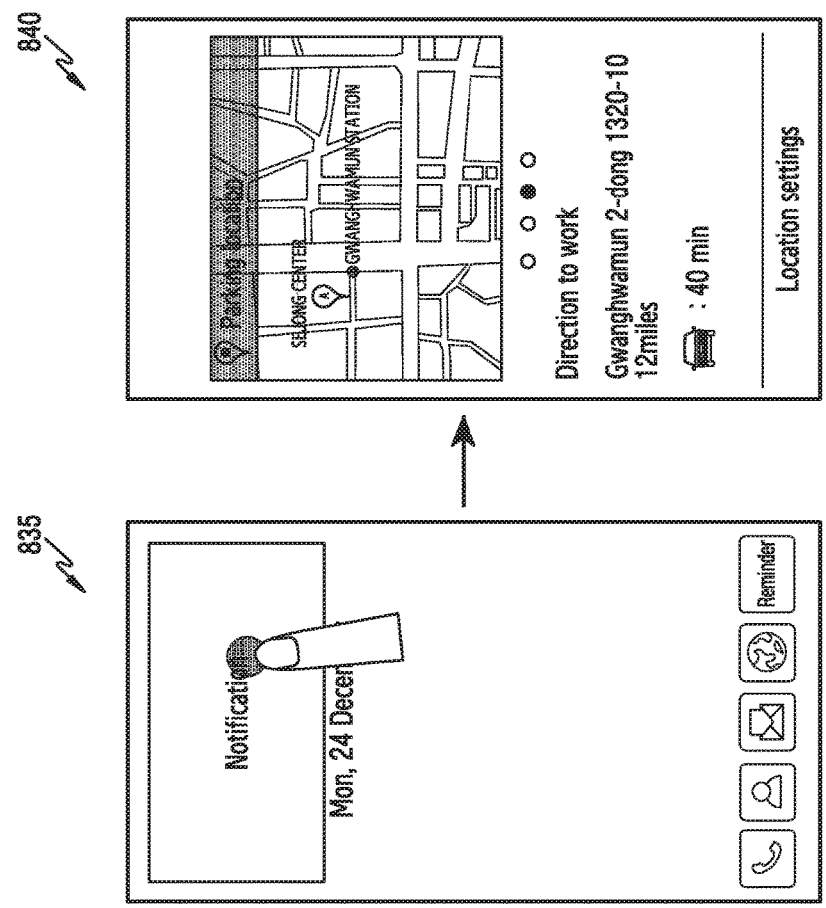

FIGS. 8A, 8B, and 8C illustrate UIs inquiring a stored notification in accordance with various embodiments of the present disclosure.

Referring to FIG. 8A, in a UI 805, a user executes a reminder of a quick panel for the sake of inquiry of the stored notification. Here, the reminder can mean an application in order for the user to directly inquire about the stored notification. If the reminder is executed in the electronic device 100, a notification panel can be activated (i.e., displayed) as in a UI 810. The UI 810 has displayed the notification panel on a left screen of the electronic device 100, but the notification panel can be arranged in various locations according to need. In a case of an electronic device including an edge panel, the notification panel may be displayed in the edge panel. If a user touches a common region within the notification panel, the electronic device 100 can display a notification as in a UI 815 in accordance with various embodiments of the present disclosure. As illustrated in the UI 815, the displayed notification can include menus of On Going, People, Device, etc. Here, the On Going menu can mean a schedule item described earlier, the People menu can include an item of communication between people, and the Device menu can include an electronic device status item. The electronic device 100 may display the UI 815 directly after the execution of the UI 805. That is, an operation procedure such as the UI 810 may be omitted in accordance with various embodiments of the present disclosure.

Referring to FIG. 8B, in a UI 820, the user executes a reminder application for the sake of inquiry of the stored notification. As in the UI 805 and the UI 820, the reminder may be executed through not only the quick panel but also through the application. If the reminder is executed in the electronic device 100, a notification panel can be activated as in a UI 825. If a user touches a designated region, a notification can be displayed as in a UI 830 in accordance with various embodiments of the present disclosure. The displaying (i.e., the UI 830) of the notification of the designated region can be implemented in a location different from the displaying (i.e., the UI 815) of the notification of the common region. In the present embodiment of the present disclosure, the displaying of the notification of the designated region and the displaying of the notification of the common region are distinguished according to the display location, but this is only exemplary. The displaying of the notification of the common region and the displaying of the notification of the designated region can be distinguished by various ways such as varying a notification window color, varying a font, etc.

Referring to FIG. 8C, a UI 835 can be a screen in which a user executes an application related to a notification by touching a specific portion of the displayed notification. If activating the related application through the displayed notification, the corresponding application can be executed and displayed as in a UI 840. Also, in this case, the displaying of the displayed notification can disappear.

FIGS. 8D, 8E, 8F, 8G, and 8H illustrate UIs calling a notification through the execution of an application in accordance with various embodiments of the present disclosure.

Figure 8D:
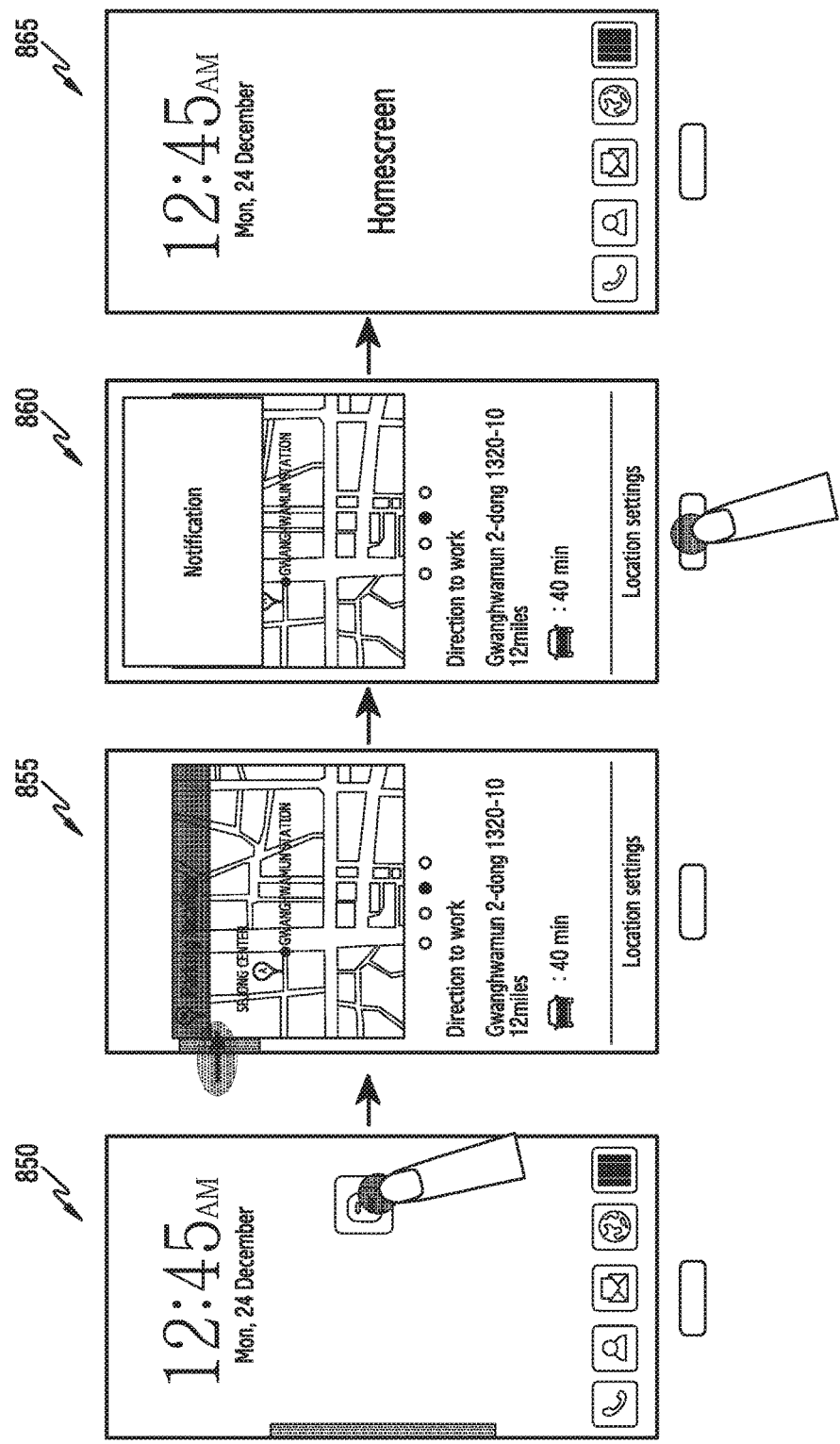
FIGS. 8D, 8E, 8F, 8G, and 8H illustrate UIs calling a notification through the execution of an application in accordance with various embodiments of the present disclosure.

Referring to FIG. 8D, in a UI 850, a user can execute an application through a touch. According to various embodiments of the present disclosure, in a case where the executed application is associated with a notification stored in a storage region, the electronic device 100 can display a notification panel overlapped with an execution screen of the application as in a UI 855. If the user touches and drags and drops the notification panel as in the UI 855, the electronic device 100 can display the notification related to the application. If the user stops the execution of the application as in a UI 860, the electronic device 100 can release the displaying of the corresponding notification as in a UI 865. At this time, the releasing of the displaying of the corresponding notification may mean deleting, and may mean returning to the storage region.

Figure 8E:
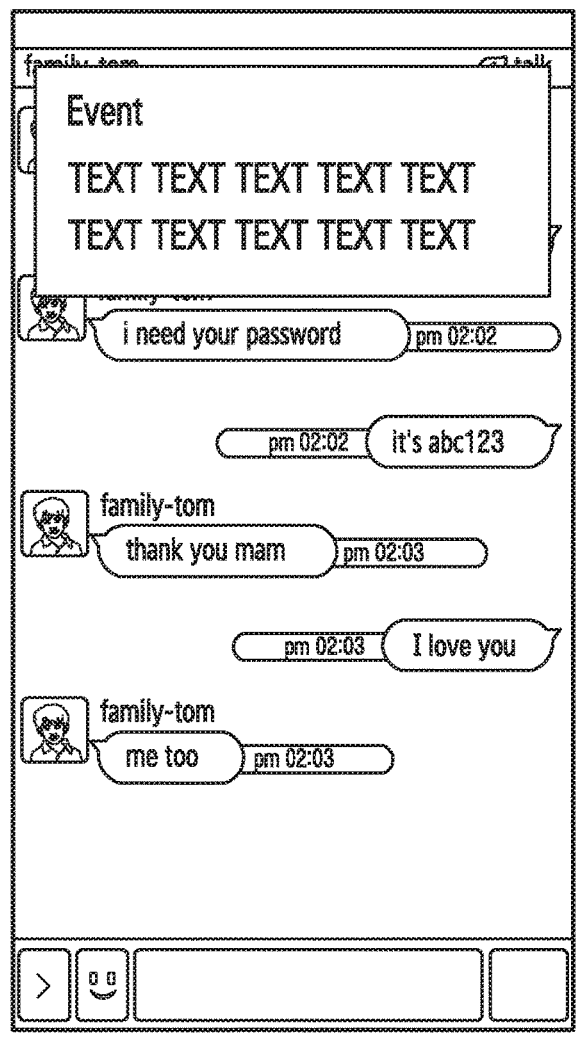

FIG. 8E is an example of a UI in which a notification is displayed overlapping with a short message service (SMS) or a multimedia message service (MMS) in a case where a user inquires about the SMS or the MMS.

Referring to FIG. 8E, the electronic device 100 can display a notification associated with an SMS or MMS sender or SMS or MMS content.

Figure 8F:
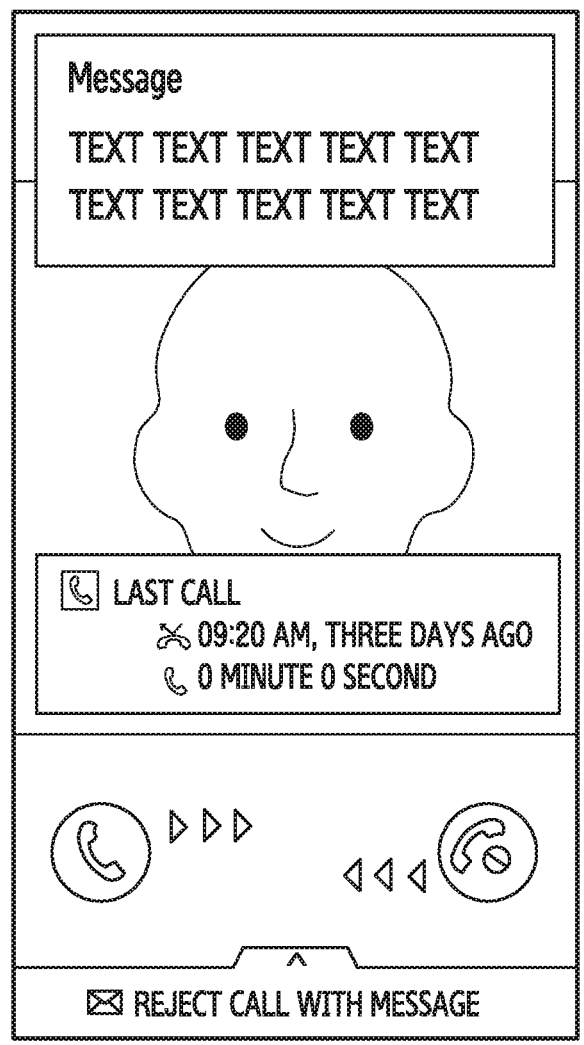

FIG. 8F is an example of a UI in which a notification is displayed overlapping with a voice call in a case where the voice call is received.

Referring to FIG. 8F, the electronic device 100 can overlap and display a message notification associated with a voice call sender, on a call reception screen. Although not illustrated in FIG. 8F, the user may enter a message window through the displayed notification and check the content of a related message.

Figure 8G:
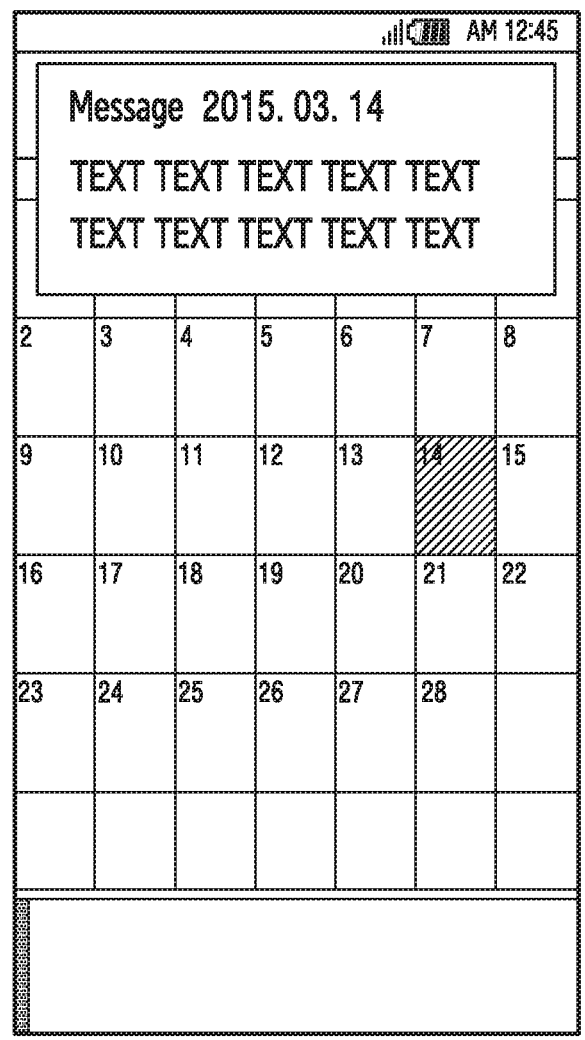

FIG. 8G is an example of a UI in which a notification is displayed overlapping with a calendar application in a case where a user executes the calendar application.

Referring to FIG. 8G, the user can be provided with a notification corresponding to a message received at a touched date, such as a missed call.

Figure 8H:
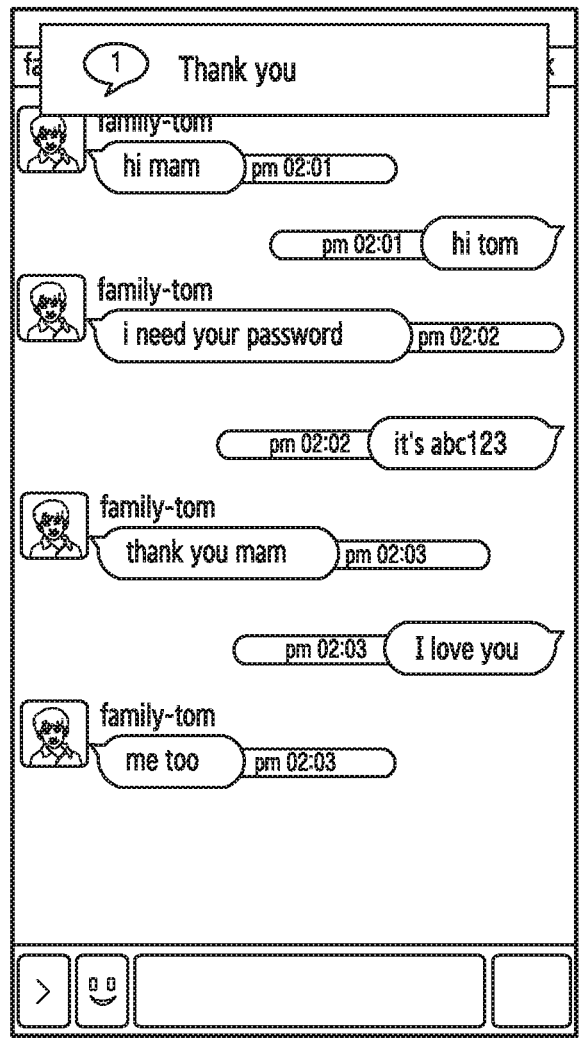

FIG. 8H is an example of a UI in which a notification is displayed overlapping with an SMS in a case where a user inquires about the SMS.

Referring to FIG. 8H, the electronic device 100 can display a replay update notification within an SNS that an SMS sender has sent. In an embodiment of FIG. 8H, the user can check the SMS while touching the displayed notification to inquire a reply of the SNS.

An operation method of an electronic device according to various embodiments can include the operations of displaying a notification, sensing a set input, storing the displayed notification corresponding to the sensed set input, and displaying the storing of the notification.

A region displaying an object indicating the storing of the notification can include one or more of a common region and a designated region. If the set input is a first set input, the notification can be stored in the common region and, if the set input is a second set input, the notification can be stored in the designated region corresponding to the notification. The first set input can be an input that moves in a first direction, and the second set input can be an input that moves in a second direction successively after moving in the first direction. The operation of storing the displayed notification can store the displayed notification in the common region corresponding to the release of the first set input, and can store the displayed notification in the designated region corresponding to a position in which the second set input is released corresponding to the release of the second set input.

The designated region can be plural, and the operation method of the electronic device can distinguish and store notifications corresponding to the designated regions in accordance with type.

The operation method of the electronic device can include the operations of checking if a notification related to an application has been stored corresponding to the execution of the application and, if there is the stored notification, accessing the corresponding notification, and displaying the accessed notification. The operation method of the electronic device can further include the operations of sensing a notification inquiry demand input, displaying a notification panel corresponding to the sensed notification inquiry demand input, and displaying a notification included in a region selected in the notification panel. The operation method of the electronic device can include the operations of displaying the notification panel including the common region or the designated regions, and displaying a notification stored in a region selected in the displayed notification panel.

The operation method of the electronic device can include the operations of, if there is an unidentified notification, displaying an unidentified notification indicator, displaying a notification panel if the indicator is selected, selecting a notification stored in a region selected in the displayed notification panel, and displaying the selected notification.

The operation method of the electronic device can include the operations of analyzing the stored notification, and varying one or more of a size, color, and display position in accordance with the analysis result of the stored notification and displaying the notification.

Methods according to various embodiments mentioned in claims of the present disclosure and/or a specification can be implemented in a form of hardware, software, or a combination of hardware and software.

In a case of implementing by software, a computer-readable storage medium storing one or more programs (i.e., software modules) can be provided. The one or more programs stored in the computer-readable storage medium are configured to be executed by one or more processors within an electronic device. The one or more programs include instructions for enabling the electronic device to execute the methods according to the various embodiments stated in the claims of the present disclosure and/or the specification.

This program (i.e., software module, software) can be stored in a random access memory (RAM), a non-volatile memory including a flash memory, a read only memory (ROM), an electrically erasable programmable ROM (EEPROM), magnetic disc storage device, a compact disc-ROM (CD-ROM), digital versatile discs (DVDs) or an optical storage device of another form, a magnetic cassette. Or, the program can be stored in a memory that is constructed in combination of some of them or all. Also, each constructed memory may be included in plural.

Further, the program can be stored in an attachable storage device accessible through a communication network such as the Internet, an intranet, a local area network (LAN), a wireless LAN (WLAN) and a storage area network (SAN), or a communication network constructed in combination of them. This storage device can connect to a device performing an embodiment of the present disclosure through an external port. Also, a separate storage device on the communication network may connect to a device performing an embodiment of the present disclosure.

In the above embodiments of the present disclosure, constituent elements included in the present disclosure have been expressed in the singular form or plural form in accordance to a proposed embodiment of the present disclosure. But, the expression of the singular form or plural form is selected suitable to a proposed situation for description convenience, and it is not intended to limit the present disclosure to singular or plural constituent elements. Despite a constituent element expressed in the plural form, it can be constructed in the singular form, or despite a constituent element expressed in the singular form, it can be constructed in the plural form.

An electronic device according to various embodiments of the present disclosure can separately store a notification that cannot immediately correspond in a case where a plurality of notifications are generated. The electronic device can sort and display the stored notification. In a case where the electronic device executes an application related to the stored notification, the electronic device can display the corresponding notification.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
at least one memory storing instructions;
a display; and
at least one processor configured to execute the stored instructions to:
display a notification message for notifying that an event occurs in the electronic device in an area,
in response to receiving a first input for moving the notification message being displayed in the area in a first direction,
cause the notification message to disappear by sliding the notification message to a first area of an edge of the display, and
after the notification message disappears, display, within the first area, an object for indicating that the notification message is stored in a common region, and
in response to receiving a second input for moving the notification message being displayed in the area in a second direction and moving in the first direction the notification message that has been moved in the second direction:
cause the notification message to disappear by sliding the notification message to a second area of the edge of the display, and
after the notification message disappears, display, within the second area, another object for indicating that the notification message is stored in a designated region,
wherein the object disappears after specified time has elapsed from a point in time that the object is first displayed, and
wherein the other object disappears after the specified time has elapsed from a point in time that the other object is first displayed.

2. The electronic device of claim 1,
wherein the common region is used for storing a notification message not requiring a classification, and
wherein the designated region is used for storing a notification message requiring a classification according to at least one specified criterion.

3. The electronic device of claim 1, wherein the at least one processor is further configured to execute the stored instructions to:
receive a third input distinct from the first input and the second input while displaying the notification message, and
in response to receiving the third input, discard the notification message.

4. The electronic device of claim 1,
wherein the at least one processor is further configured to execute the stored instructions to:
display, in response to receiving a specified input for calling notification messages that are stored, the notification message that has been caused to disappear by the first input or the second input, and
wherein the notification message stored in the designated region is highlighted relative to the notification message stored in the common region.

5. The electronic device of claim 1, wherein the at least one processor is further configured to execute the stored instructions to:

receive a third input on the notification message being displayed in the area, wherein the third input is distinct from the first input and the second input, and in response to receiving the third input, discard the notification message.

6. The electronic device of claim 1, wherein the at least one processor is further configured to execute the stored instructions to:

display a screen by using a first application installed in the electronic device, while displaying the screen by using the first application, detect that the event occurs in the electronic device, wherein the event is associated with a second application installed in the first application, and wherein the second application is distinct from the first application, and in response to detecting that the event occurs in the electronic device, display the notification message with the screen.

7. The electronic device of claim 6, wherein the notification message is partially superimposed on the screen.

8. The electronic device of claim 6, wherein the at least one processor is further configured to execute the stored instructions to:

after the notification message disappears, execute a third application, and in response to executing the third application, display the notification message that is stored by the first input as partially superimposed on a user interface of the third application.

9. The electronic device of claim 8, wherein the execution of the third application is caused by a counterpart electronic device, wherein the notification message that is partially superimposed on the user interface of the third application includes the event associated with the counterpart electronic device, and wherein the user interface of the third application is displayed for another event associated with the counterpart electronic device.

10. An operation method of an electronic device, the method comprising:

displaying a notification message for notifying that an event occurs in the electronic device in an area;

in response to receiving a first input for moving the displayed notification message being displayed in the area in a first direction:

causing the notification message to disappear by sliding the notification message to a first area of an edge of the display, and after the notification message disappears, displaying, within the first area, an object for indicating that the notification message is stored in a common region; and in response to receiving a second input for moving the notification message being displayed in the area in a second direction and moving in the first direction the notification message that has been moved in the second direction:

causing the notification message to disappear by sliding the notification message to a second area of the edge of the display, and after the notification message disappears, displaying, within the second area, another object for indicating that the notification message is stored in a designated region, wherein the object disappears after specified time has elapsed from a point in time that the object is first displayed, and wherein the other object disappears after the specified time has elapsed from a point in time that the other object is first displayed.

11. The method of claim 10, wherein the common region is used for storing a notification message not requiring a classification, and wherein the designated region is used for storing a notification message requiring a classification according to at least one specified criterion.

12. The method of claim 10, further comprising:

receiving a third input distinct from the first input and the second input while displaying the notification message; and in response to receiving the third input, discarding the notification message.

13. The method of claim 10, further comprising:

displaying, in response to receiving a specified input for calling notification messages that are stored, the notification message that has been caused to disappear by the first input or the second input, wherein the notification message stored in the designated region is highlighted relative to the notification message stored in the common region.

14. The method of claim 10, further comprising:

receiving a third input on the notification message being displayed in the area, wherein the second third input is distinct from the first input and the second input; and in response to receiving the third input, discarding the notification message.

15. The method of claim 10, wherein the displaying of the notification message comprises:

displaying a screen by using a first application installed in the electronic device;

while displaying the screen by using the first application, detecting that the event occurs in the electronic device, wherein the event is associated with a second application installed in the first application, and wherein the second application is distinct from the first application; and in response to detecting that the event occurs in the electronic device, displaying the notification message with the screen.

16. The method of claim 15, wherein the notification message is partially superimposed on the screen.

17. The method of claim 15, further comprising:

after the object disappears, executing a third application; and in response to executing the third application, displaying the notification message that is stored by the first input as partially superimposed on a user interface of the third application.

18. The method of claim 17, wherein the execution of the third application is caused by a counterpart electronic device, wherein the notification message that is partially superimposed on the user interface of the third application includes the event associated with the counterpart electronic device, and wherein the user interface of the third application is displayed for another event associated with the counterpart electronic device.

* * * * *